United States Patent
Gourlay et al.

(10) Patent No.: US 9,442,742 B2
(45) Date of Patent: Sep. 13, 2016

(54) METHOD AND SYSTEM FOR NETWORK DEVICE MAINTENANCE

(71) Applicant: Arista Networks, Inc., Santa Clara, CA (US)

(72) Inventors: Douglas Alan Gourlay, San Francisco, CA (US); Hua Zhong, Santa Clara, CA (US)

(73) Assignee: Arista Networks, Inc., Santa Clara, CA (US)

( * ) Notice: Subject to any disclaimer, the term of this patent is extended or adjusted under 35 U.S.C. 154(b) by 176 days.

(21) Appl. No.: 14/490,066

(22) Filed: Sep. 18, 2014

(65) Prior Publication Data
US 2016/0085560 A1 Mar. 24, 2016

(51) Int. Cl.
*G06F 9/44* (2006.01)
*G06F 13/40* (2006.01)

(52) U.S. Cl.
CPC ......... *G06F 9/4416* (2013.01); *G06F 13/4022* (2013.01)

(58) Field of Classification Search
CPC .................. G06F 9/4416; G06F 13/4022
See application file for complete search history.

(56) References Cited

U.S. PATENT DOCUMENTS

| 6,185,678 | B1 * | 2/2001 | Arbaugh | G06F 21/575 713/2 |
| 6,202,091 | B1 * | 3/2001 | Godse | G06F 9/4408 709/220 |
| 7,434,201 | B2 * | 10/2008 | Culter | G06F 9/4411 713/1 |
| 8,793,477 | B2 * | 7/2014 | Horvath | G06F 21/575 713/2 |

* cited by examiner

*Primary Examiner* — Stefan Stoynov
(74) *Attorney, Agent, or Firm* — Osha Liang LLP

(57) ABSTRACT

A method for maintaining a switch. The method includes identifying a first phase to enter in a boot-up process for the switch, where the boot-up process includes a number of phases and the first phase is one of the phases. The method further includes determining a phase exit condition from a first snapshot of the switch, where the first snapshot includes state information for each of the of phases. The method further includes transitioning to the first phase and after transitioning to the first phase: starting a first countdown timer for the first phase, and executing, on the switch, a first networking protocol for the first phase. The method further includes determining, in response to the executing, that a first current state of the switch satisfies the phase exit condition, and exiting the first phase, where the first countdown timer is not expired when exiting the first phase.

19 Claims, 11 Drawing Sheets

| Switch Mode | Management Port | Any other Port |
|---|---|---|
| Production Mode | Active | Active, Listen-only mode or Off |
| Maintenance Mode | Active | Listen-only Mode or Off |

FIG. 2

METHOD AND SYSTEM FOR NETWORK DEVICE MAINTENANCE

BACKGROUND

Over the lifecycle of a network device, the network device must be properly maintained to allow a data center to function as intended. This may be accomplished by performing a series of maintenance steps to network device hardware and/or software to enable the network device to perform the network device's specific intended function in the data center. Performing maintenance on the network device typically requires that the network device be taken offline and subsequently restarted with the maintenance applied. The operating state of the network device is prone to errors once the network device resumes operation. This leads to the network device not functioning as intended and can be costly to identify.

SUMMARY

In general, in one aspect, the invention relates to a non-transitory computer readable medium comprising instructions, which when executed by at least one processor perform a method, the method comprising identifying a first phase to enter in a boot-up process for a switch, wherein the boot-up process comprises a plurality of phases and the first phase is one of the plurality of phases, determining a phase exit condition from a first snapshot of the switch, wherein the first snapshot comprises state information for each of the plurality of phases, transitioning to the first phase, after transitioning to the first phase: starting a first countdown timer for the first phase, executing, on the switch, a first networking protocol for the first phase, determining, in response to the executing, that a first current state of the switch satisfies the phase exit condition, and exiting the first phase, wherein the first countdown timer is not expired when exiting the first phase.

In general, in one aspect, the invention relates to a method for maintaining a switch, comprising identifying a first phase to enter in a boot-up process for the switch, wherein the boot-up process comprises a plurality of phases and the first phase is one of the plurality of phases, determining a phase exit condition from a first snapshot of the switch, wherein the first snapshot comprises state information for each of the plurality of phases, transitioning to the first phase, after transitioning to the first phase: starting a first countdown timer for the first phase, executing, on the switch, a first networking protocol for the first phase, determining, in response to the executing, that a first current state of the switch satisfies the phase exit condition, exiting the first phase, wherein the first countdown timer is not expired when exiting the first phase.

In general, in one aspect, the invention relates to a switch, comprising: a management port, a plurality of ports, a processor, and memory comprising instructions, which when executed by the processor, enable the switch to perform a method. The method comprising identifying a first phase to enter in a boot-up process for the switch, wherein the boot-up process comprises a plurality of phases and the first phase is one of the plurality of phases, determining a phase exit condition from a first snapshot of the switch, wherein the first snapshot comprises state information for each of the plurality of phases, transitioning to the first phase, after transitioning to the first phase: starting a first countdown timer for the first phase, executing, on the switch, a first networking protocol for the first phase, determining, in response to the executing, that a first current state of the switch satisfies the phase exit condition, and exiting the first phase, wherein the first countdown timer is not expired when exiting the first phase.

Other aspects of the invention will be apparent from the following description and the appended claims.

BRIEF DESCRIPTION OF DRAWINGS

FIG. 2 shows exemplary port statuses of ports on a switch in accordance with one or more embodiments of the invention.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-6C, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

In general, embodiments of the invention relate to a method and system for network device maintenance. More specifically, one or more embodiments of the invention enable a user (e.g. a network administrator) to automate (or substantially automate) the boot-up process of a switch in maintenance mode as determined by snapshots describing the operating state of a switch. Additionally, obtaining the snapshots of a switch may identify errors in the operating state of the switch during or following the boot-up process. Converging to the state information in the snapshot of a phase in the boot-up process rather than a countdown timer of the phase may also accelerate the boot-up process.

The following description describes embodiments of the invention in which a switch undergoes network device maintenance described below. However, the invention is not limited to switches; rather, embodiments of the invention may be extended to maintenance for other network devices, such as routers. Also, embodiments of the invention are not limited to network devices in a data center; rather embodiments of the invention may be extended to environments other than a data center in which network devices require maintenance.

Figure 1:
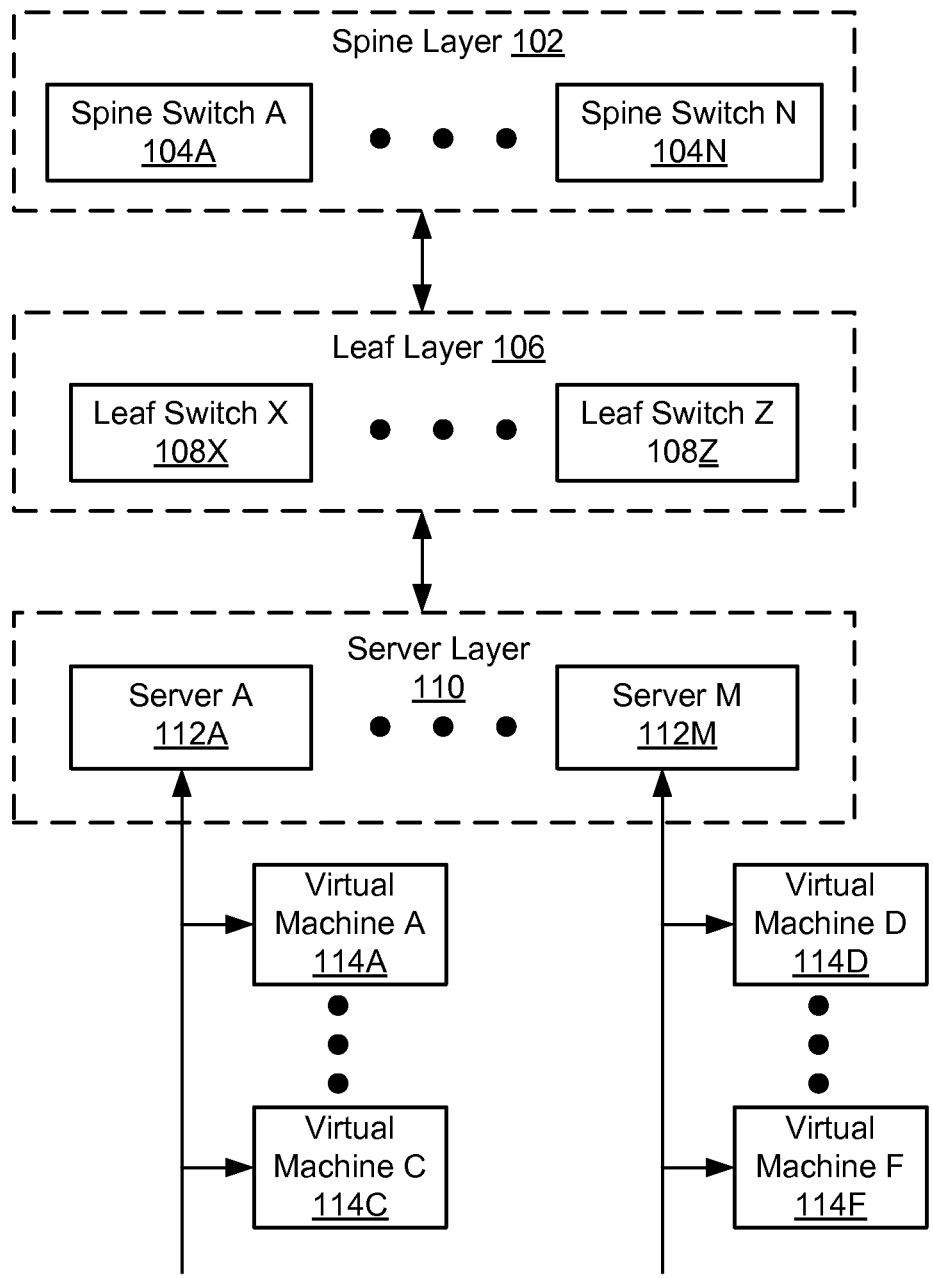
FIG. 1 shows a system in accordance with one or more embodiments of the invention.

FIG. 1 shows a system in accordance with one or more embodiments of the invention. In one embodiment of the invention the system is a data center that includes a spine layer (102), a leaf layer (106), a server layer (110) and one or more virtual machines (114A-114F). The spine layer may include one or more spine switches (104A-104N), the leaf layer may include one or more leaf switches (108X-108Z), and the server layer may include one or more servers (112A-112M). One skilled in the art will recognize that the number of spine switches, leaf switches, servers, and virtual machines in a data center may vary depending on the requirements that the data center is designed to meet without departing from the invention.

In one embodiment of the invention, the server layer (110) includes servers (112A-112M) that connect to the virtual machines (114A-114F) in a data center, the leaf layer (106) includes switches that connect to the servers in the server layer and the spine layer (102) includes switches that connect to the switches in the leaf layer. A switch is a physical device that includes persistent storage, memory (e.g., Random Access Memory), one or more processors, and two or more physical ports. Each port may or may not be connected to another device on a network (e.g., a server, a switch, a router, etc.). Each spine switch (104A-104N) and leaf switch (108X-108Z) is configured to receive packets via the ports and determine whether to (i) drop the packet, (ii) process the packet in accordance with one or more embodiments of the invention, or (iii) send the packet out another port on the network device. How the switch makes the determination of whether to drop the packet or send the packet to another device on the network depends, in part, on whether the switch is a layer-2 (L2) switch or a layer-3 (L3) switch (also referred to as a multilayer switch). If the switch is operating as a L2 switch, the switch uses the destination media access control (MAC) address along with a forwarding table to determine out of which port to send the packet. If the switch is operating as a L3 switch, the switch uses the destination internet protocol (IP) address along with a routing table to determine out of which port to send the packet. If the switch is a multilayer switch, the multilayer switch includes functionality to process packets using both MAC addresses and IP addresses.

In addition to the functionality described above, the switches may include functionality to execute other protocols, such as link layer discovery protocol (LLDP), multi-chassis link aggregation protocol (MLAG), virtual router redundancy protocol (VRRP), spanning tree protocol (STP), address resolution protocol (ARP), border gateway protocol (BGP), interior gateway protocol (IGP), protocol independent multicast (PIM), and internet group management protocol (IGMP). The switches may implement other protocols without departing from the invention.

In one embodiment of the invention, the persistent storage in the switch may include any non-transitory computer readable medium that includes instructions, which, when executed by one or more processors in the switch, enable the switch to perform the functions described in accordance with one or more embodiments of the invention (see e.g., FIGS. 5A-5D).

In one embodiment of the invention, a server (112A-112M) is a computer system. A computer system may include any type of system (e.g. software and computer hardware) that is configured to generate, send, receive, and/or process requests and replies either locally or over a network using software and computer hardware. The server may include a processor, memory, and one or more physical network interfaces. Examples of types of servers include, but are not limited to, DHCP servers, database servers, application servers, file servers, print servers, and mail servers. The computer system may also include functionality to execute one or more virtual machines, where each virtual machine may be configured to generate, send, receive, and/or process MAC frames. In one embodiment of the invention, each virtual machine corresponds to an execution environment that is distinct from the execution environment provided by the server upon which it is executing. Examples of virtual machines include, but are not limited to, Oracle® VM and VMware® Virtual Server. (Oracle is a registered trademark of Oracle International Corporation and VMware is a registered trademark of VMware, Inc.).

The invention is not limited to the system configuration shown in FIG. 1.

FIG. 2 shows exemplary port statuses of ports on a switch in accordance with one or more embodiments of the invention. The port status is the status of a port on the switch. The port status is at least one of active, listen-only mode, or off. A port that is active may receive packets from other network devices and forward packets to other network devices. A port in listen-only mode may receive packets from other network devices. However, a port in listen-only mode may not forward packets to other network devices. A port that is off may not receive packets from other network devices and may not forward packets to other network devices. In one embodiment of the invention, the port statuses of ports on a switch vary based on the switch mode of the switch. The switch mode includes production mode and maintenance mode, each described below.

In one embodiment of the invention, production mode of a switch is a switch mode in which the ports on the switch may be active, in listen-only mode or off. In production mode, the switch communicates, through the active ports, with network devices in the data center based on the switch's network configuration.

In one embodiment of the invention, maintenance mode of a switch is a switch mode in which the ports on the switch are in listen-only mode or off, excluding the management port. The management port is a port on the switch with a management interface that includes a console with functionality to run command line interface (CLI) commands to maintain and configure the switch. Maintenance on the switch includes software and hardware maintenance. Software maintenance may include replacing firmware and updating software on the switch, such as the operating system (EOS) and routing switch software. Hardware maintenance may include replacing optical connectors. Because the ports of the switch, excluding the management port are not active (listen-only mode or off) in maintenance mode, the switch may be shutdown and booted-up back into maintenance mode without altering the functionality of the network devices in the data center. The steps to transition from production mode to maintenance mode are described in FIG. 5A. The steps to transition from maintenance mode to production mode are in FIG. 5C.

The invention is not limited to the port statuses shown in FIG. 2.

Figure 3:
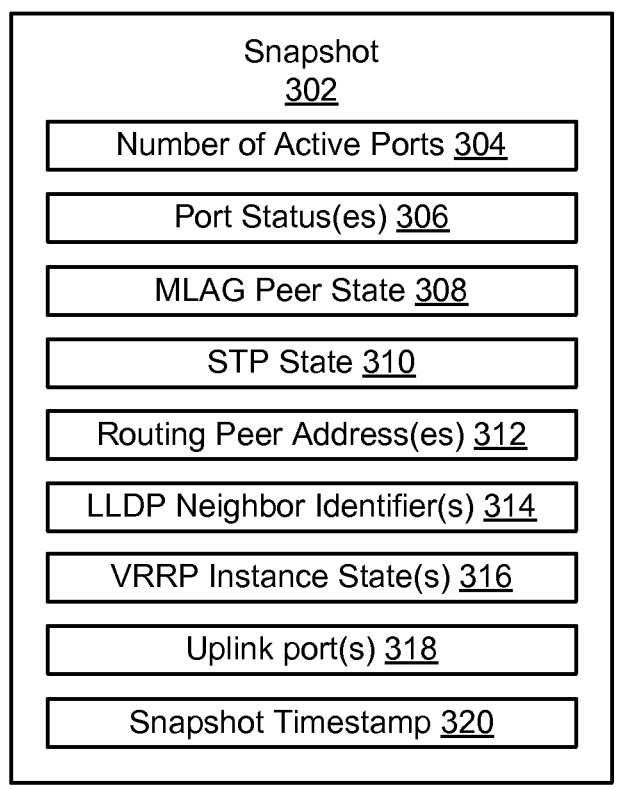
FIG. 3 shows a snapshot in accordance with one or more embodiments of the invention.

FIG. 3 shows a snapshot (302) in accordance with one or more embodiments of the invention. In one embodiment of the invention, the snapshot captures the operating state of a switch at the time the snapshot is obtained.

In one embodiment of the invention, the snapshot includes the following state information to describe the operating state of a switch: (i) number of active ports (304), (ii) port statuses (306), (iii) multichassis link aggregation protocol (MLAG) peer state (308), (iv) spanning tree protocol (STP) state (310), (v) routing peer addresses (312), (vi) link layer discovery protocol (LLDP) neighbor identifiers (314), (vii) virtual router redundancy protocol (VRRP) instance states (316), (viii) uplink ports (318), and (ix) snapshot timestamp (320). Each of the aforementioned components are described below.

In one embodiment of the invention, the number of active ports (304) corresponds to the number of ports on the switch whose port statuses are active. In one or more embodiments of the invention, the port statuses (306) are the port statuses of each of the ports on the switch, including active, listen-only mode, and off (described above in FIG. 2).

In one or more embodiments of the invention, MLAG is a switch behavior, where two switches cooperate to provide the illusion of a single switch from the point of view of any externally connected device. The two switches are called MLAG peers, their union is called the MLAG domain, and the link or links directly connecting them are called the peer link or links. In one embodiment of the invention, the MLAG peer state (308) is the state of a switch's MLAG peer. The MLAG peer state may be one of active or inactive. A MLAG peer state of active corresponds to a switch in a MLAG domain. A MLAG peer state of inactive corresponds to a switch in not a MLAG domain.

In one or more embodiments of the invention, STP is a network protocol that ensures a loop-free path from one network device (e.g. switch) to another network device. A loop-free path is a subset of the network topology that does not include cycles. The loop-free path is the shortest distance between the two network devices among the possible paths. The shortest distance may be measured by the sum of the cost values assigned to each port in the loop-free path. For example, the cost value assigned to each port may correspond to the transmission speed of the port. A lower cost value represents a higher transmission speed of a port. A higher cost value represents a lower transmission speed of a port. A root bridge port is a port on a network device corresponding to the starting point of a loop-free path. The root bridge port is selected by having the lowest spanning tree root bridge priority. The spanning tree root bridge priority may be represented as a cost value. For example, the cost value may correspond to the transmission speed of the port. As mentioned above, a lower cost value represents a higher transmission speed of the port. The shortest distance is calculated from the root bridge port to ports on other network devices. Designated ports are ports on network devices that are a part of the shortest path from the root bridge port to a port on another network device. In one embodiment of the invention, the STP state (310) is the STP activity level of a port on the switch. The STP states include forwarding, blocking, and disabled. A forwarding STP state of a port on a switch corresponds to the ability to receive packets and send packets. Root bridge ports and designated ports may be in a forwarding STP state. A blocking STP state of a port on a switch corresponds to the ability to receive bridge protocol data units (BPDU). Network devices (e.g. switches) exchange network topology information through BPDUs. However, the port does not receive packets and send packets in a blocking STP state. Ports excluding root bridge ports and designated ports are in a blocking state. A disabled STP state of a port is when a port is manually isolated from a network by a user (e.g., network administrator).

In one embodiment of the invention, the routing peer addresses (312) are the IP addresses of a switch's routing peers. Routing peers may correspond to L3 switches that are configured to share routing table information with one another. A routing table may include information about the topology of the network surrounding it, the routes to network destinations, next-hop information, and routing metrics related to the routes. Next-hop information may include the IP address of the next network device to which the packet is to be forwarded (i.e., sent) on the route to the destination of the packet. Routing metrics include, but are not limited to, information related to the route the packet may take towards its destination and may be represented by numerical values representative of the "cost" of the route. For example, the cost of the route may be measured by the number of "hops" (i.e., network devices) that the packet must travel through before reaching its destination.

In one embodiment of the invention, LLDP neighbor identifiers (314) correspond to the MAC addresses of the LLDP neighbors of a switch. A LLDP neighbor of a switch is connected to a port on the switch and is a network device that is capable of running LLDP. LLDP is a network protocol used by network devices (e.g. switches) for advertising the network device's identity, capabilities, and neighbors.

In one or more embodiments of the invention, VRRP is a network protocol that configures virtual routers. A virtual router is one or more network devices (e.g. L3 switches), where the network devices in the virtual router are referred to as VRRP peers. One network device in the virtual router is a master and the remaining network devices are backup. In one embodiment of the invention, the VRRP instance states (316) of a switch are the states of the switch in each virtual router in which the switch is a component. The VRRP instance states include a virtual router identifier (VRID) and at least one state of master or backup. A VRRP virtual router is identified by the VRID. A VRID may correspond to a sequence of characters, including numeric, alphanumeric, and alpha. For example, the VRID may correspond to VR02. The master in a virtual router sends advertisements of packets periodically and forwards packets received by the virtual router. The backups in a virtual router are inactive unless the master in the virtual router fails. One backup in a virtual router then assumes the role of the master.

In one embodiment of the invention, the uplink ports (318) are the ports of a leaf switch that connect to spine switches. A port name of an uplink port on a switch may be identified by a sequence of characters, including alpha characters, numeric characters, and alphanumeric characters. For example, a port name of an uplink port may be Ethernet 1.

In one embodiment of the invention, the snapshot timestamp (320) corresponds to the date and time identifying the time the snapshot is obtained. The snapshot timestamp may correspond to a sequence of characters that represent a date and a time, including alphanumeric characters and numeric characters. For example, the snapshot timestamp may be represented as 2013-11-25 11:30am. In the previous example, the snapshot is obtained at 11:30 am on Nov. 25, 2013. In one embodiment of the invention, the operating state of a switch may then be tracked over time by the state information in different snapshots obtained in the lifecycle of the switch.

One skilled in the art will recognize that the state information in the snapshot may include additional information, such as the number of virtual machines on the server connected to the switch, without departing from the invention.

The invention is not limited to the snapshot shown in FIG. 3.

Figure 4:
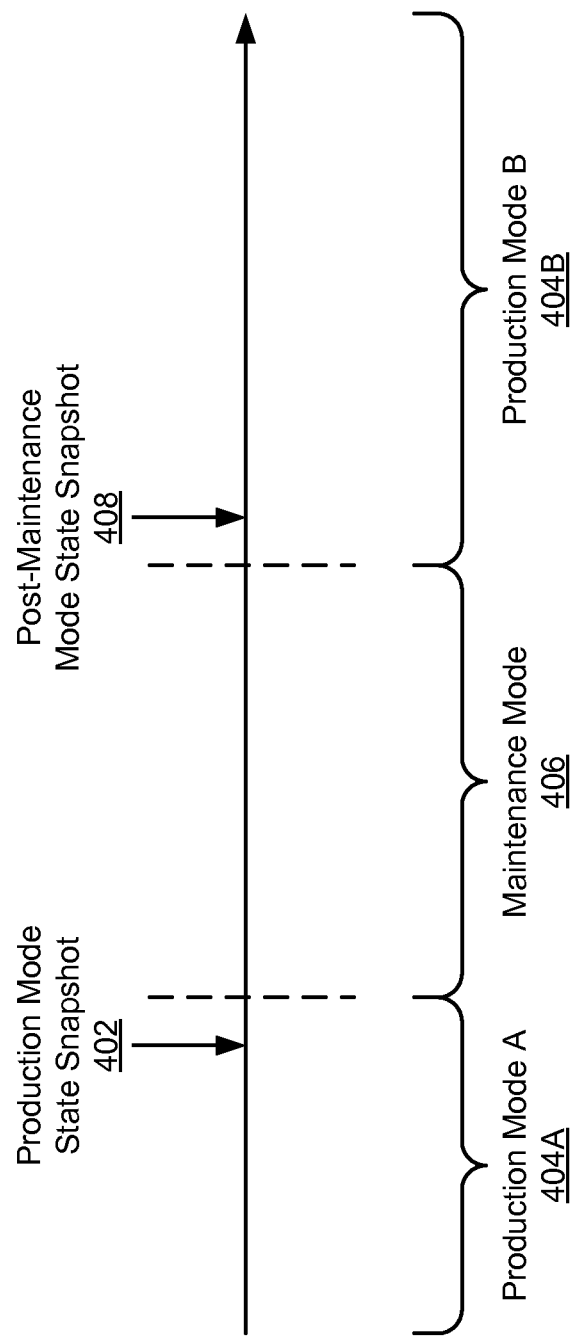
FIG. 4 shows a timeline of switch modes in accordance with one or more embodiments of the invention.

FIG. 4 shows a timeline of switch modes in accordance with one or more embodiments of the invention.

In one embodiment of the invention, the timeline starts when a switch is in production mode A (404A). A production mode state snapshot (402) is obtained. The production mode state snapshot includes state information of the switch in production mode A prior to transitioning to maintenance mode. The production mode state snapshot may include the state information described in FIG. 3. Once the production mode state snapshot is obtained, the switch then transitions to maintenance mode (406).

In one or more embodiments of the invention, in maintenance mode, the switch is shutdown (described below in FIG. 5A), maintenance is performed (described below in FIG. 5B), and the switch undergoes a boot-up process (described below in FIG. 5C).

In one embodiment of the invention, the switch then transitions to production mode B (404B). Once in production mode B, a post-maintenance mode state snapshot (408) is obtained. The post-maintenance mode state snapshot includes state information of the switch in production mode B after transitioning from maintenance mode. The post-maintenance mode state snapshot may include the state information described in FIG. 3.

Figure 5A:
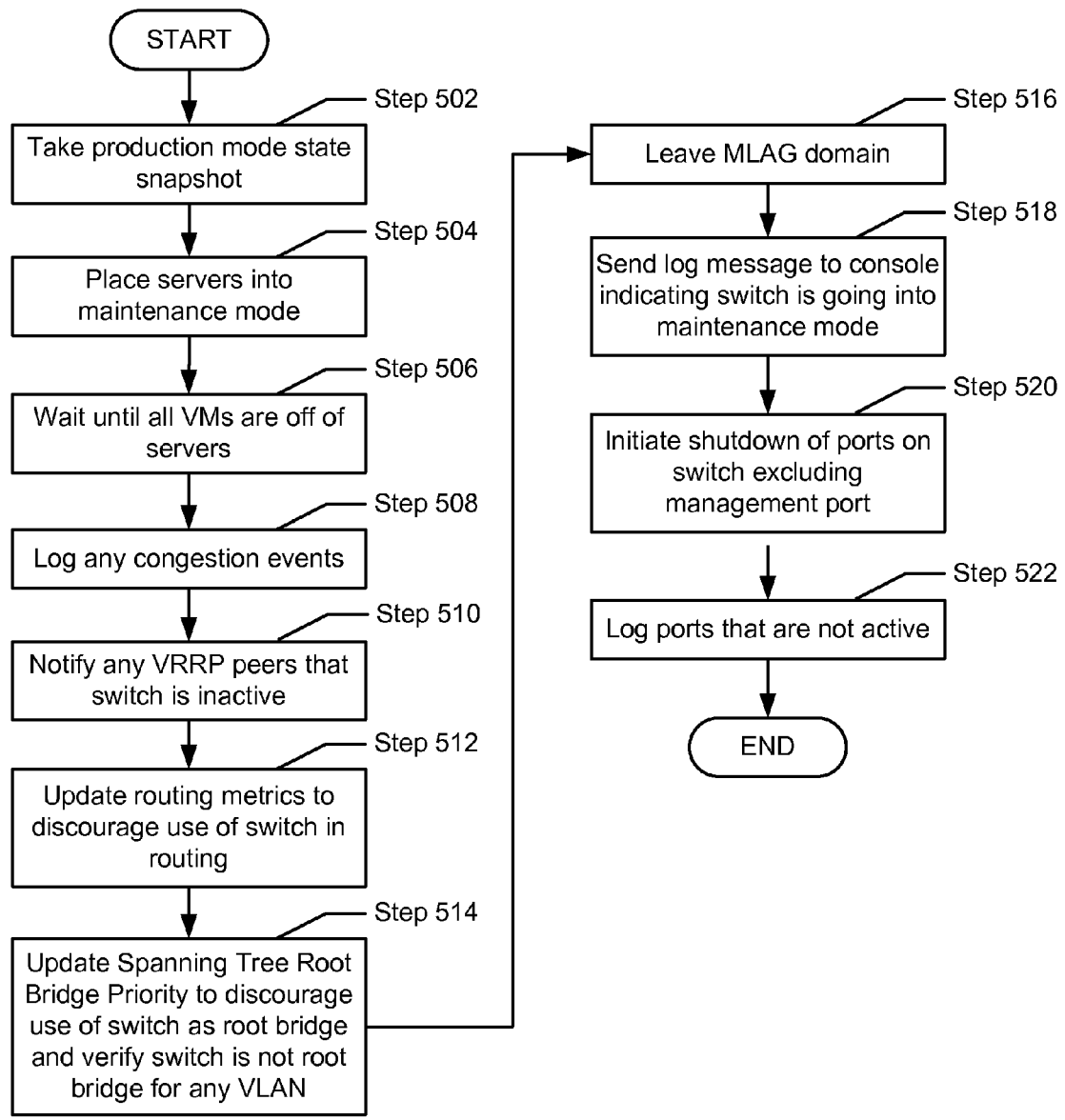
FIG. 5A shows a method for shutdown of a switch in accordance with one or more embodiments of the invention.
Figure 5B:
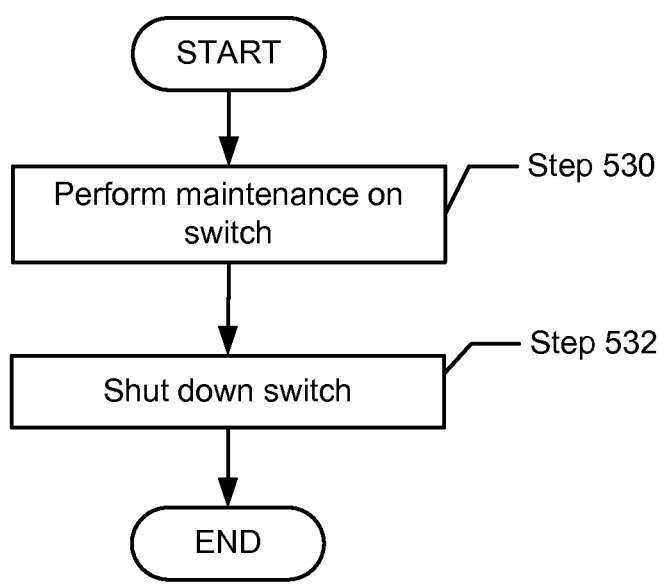
FIG. 5B shows a method for switch maintenance in accordance with one or more embodiments of the invention.
Figure 5C:
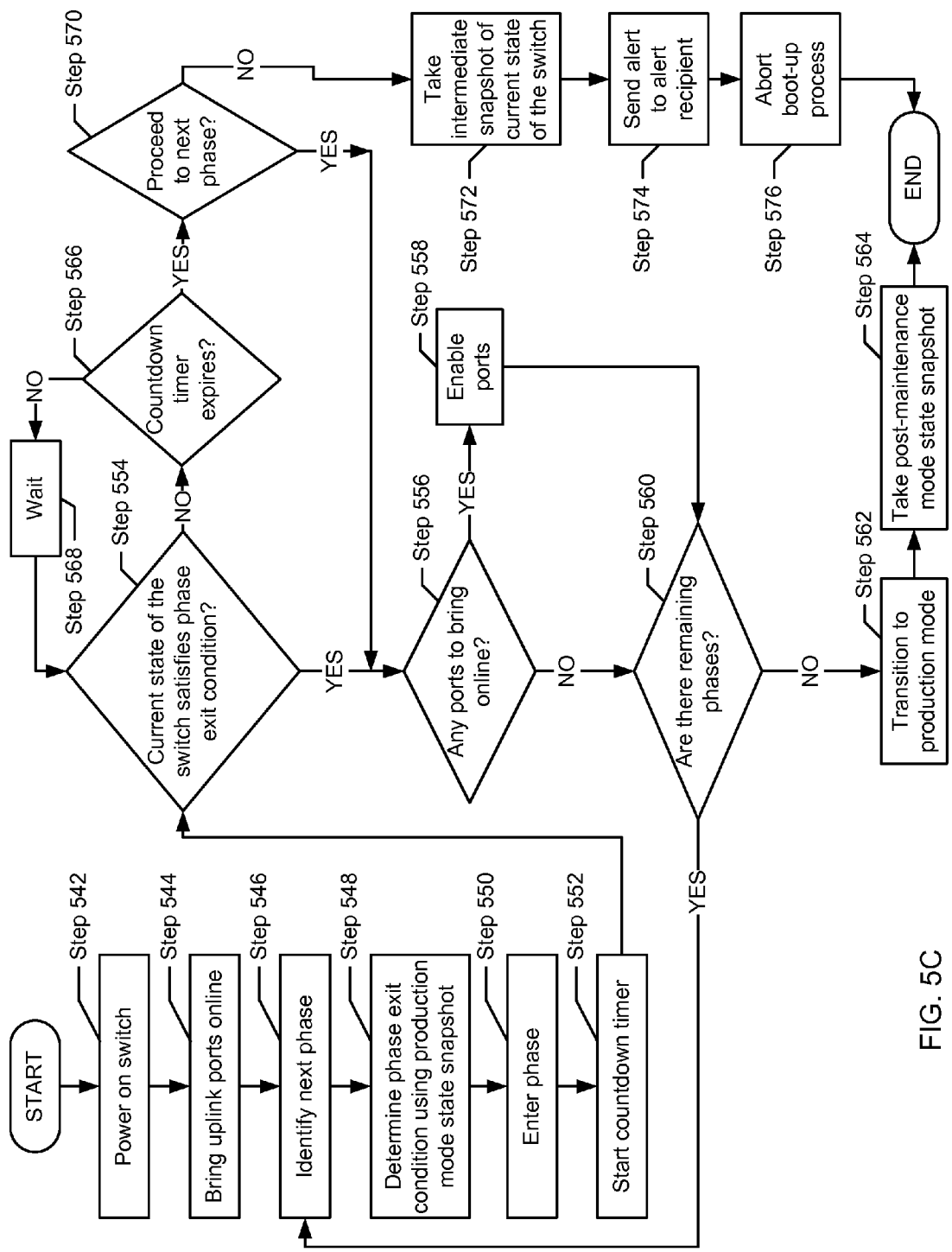
FIG. 5C shows a method for boot-up of a switch in accordance with one or more embodiments of the invention.
Figure 5D:
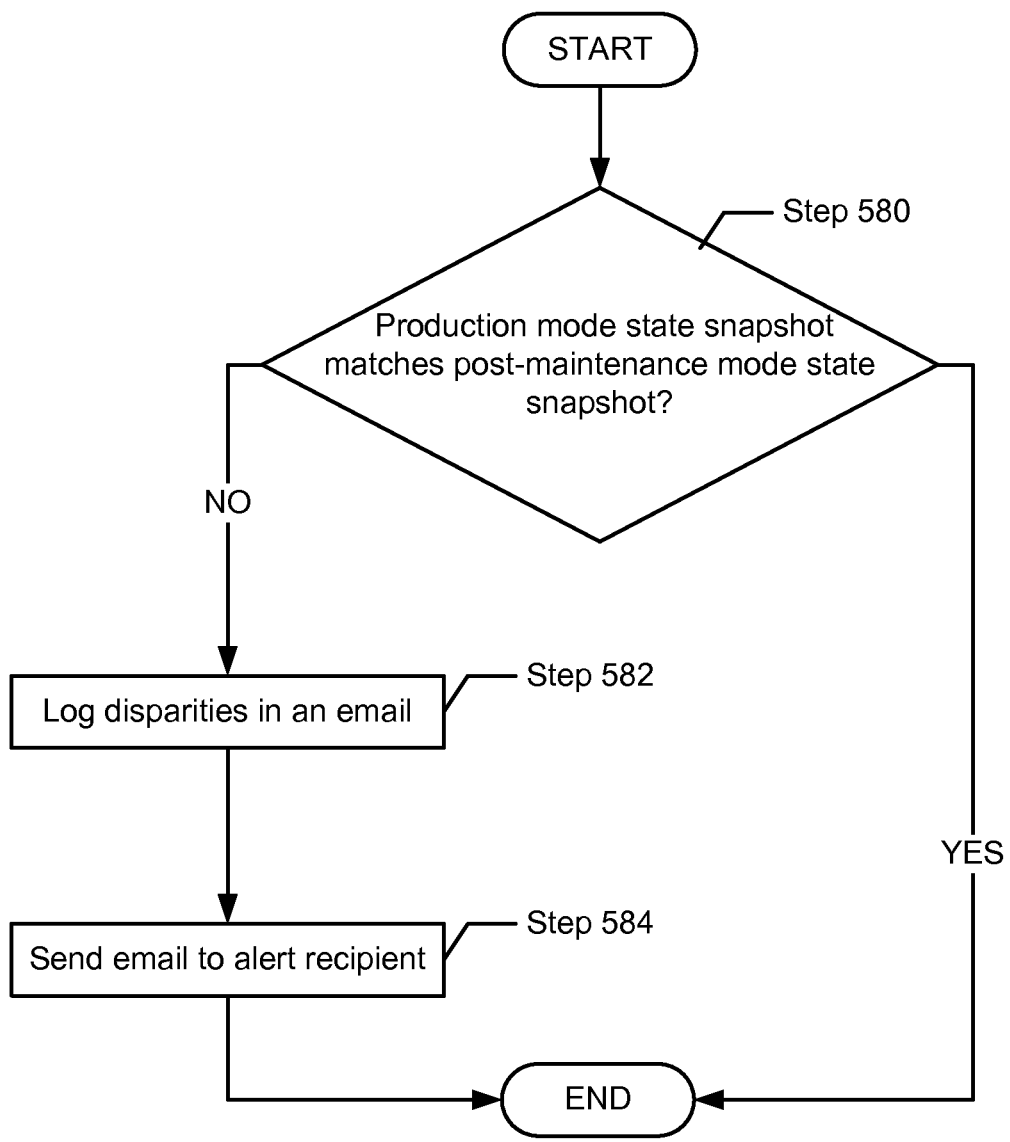
FIG. 5D shows a method for processing snapshots in accordance with one or more embodiments of the invention.

In one embodiment of the invention, the state information in the production mode state snapshot (402) and the state information in the post-maintenance mode state snapshot (408) may then be compared to determine whether the operating state of the switch has changed from the maintenance applied in the maintenance mode (406) (described in FIG. 5D).

One skilled in the art will recognize that more than snapshot A and snapshot B may be obtained at any time in the lifecycle of a switch without departing from the invention. Further, the lifecycle of a switch is not limited to the modes shown in FIG. 4. For example, after production mode B (404B), the switch may enter another maintenance mode not shown in FIG. 4.

The invention is not limited to the system configuration shown in FIG. 4.

FIGS. 5A-5D show flowcharts in accordance with one or more embodiments of the invention. While the various steps in the following flowcharts are presented and described sequentially, one of ordinary skill will appreciate that some or all of the steps may be executed in different orders, may be combined or omitted, and some or all of the steps may be executed in parallel.

FIG. 5A shows a method for shutdown of a switch in accordance with one or more embodiments of the invention.

Turning to FIG. 5A, in Step 502, a production mode state snapshot is obtained. The production mode snapshot describes the operating state of the switch at the time the production mode snapshot is obtained. The production mode state snapshot may include the state information described in FIG. 3.

In Step 504, the servers connected to the switch are placed into maintenance mode. The servers in maintenance mode are inactive. Inactive servers cannot send and receive requests and replies. In Step 506, the switch waits until no virtual machines connected to the servers exist. An example of software that tracks the number of virtual machines on the servers and determines the length of the wait time is VMware® VM Tracer (VMware is a registered trademark of VMware, Inc.). To remove all virtual machines on the servers, the virtual machines are moved away from the servers in maintenance mode to servers that are not in maintenance mode. Servers that are not in maintenance mode are active. Active servers may send and receive requests and replies. The execution environment of each virtual machine that is moved is preserved. An example of software that moves virtual machines from servers that are underperforming as in the case of the servers in maintenance mode is VMware® VMotion (VMware is a registered trademark of VMware, Inc.). In Step 508, any network congestion events caused by moving the virtual machines are monitored and logged. Network congestion may correspond to excess load on a network device leading to a disruption of the network and/or data center. A disruption includes, but is not limited to a loss of a packet and queuing delays. In one embodiment of the invention, the congestion events may be logged to a user (e.g. network administrator) on a console on the management interface of the management port on the switch that remains active in maintenance mode.

In Step 510, any virtual router redundancy protocol (VRRP) peers are notified that the switch is inactive. In one embodiment of the invention, the switch has a VRRP instance state of master for a virtual router. Priority ratings are used to assign a master of a virtual router. For example, the priority rating may be represented as a numerical score. When the switch is inactive, a VRRP peer with the highest priority rating assumes the role of master. For example, a VRRP peer assigned a priority rating of 10 assume the role of master over another VRRP peer assigned a priority rating of 7. In another embodiment of the invention, the switch has a VRRP instance state of backup for a virtual router. In such cases when the switch is inactive, the priority rating of the switch is reduced to prevent the switch from assuming the master role in the virtual router. For example, the priority rating may be set to negative number.

In Step 512, routing metrics are updated to discourage the use of the switch in routing a packet to the packet's destination. Routing metrics are updated to a higher routing metric to discourage the use of the switch in routing. As mentioned above in FIG. 3, the routing metrics may be represented by numerical values representative of the "cost" of the route. Network devices with the lowest routing metrics are chosen to reduce the "cost" of the route.

In Step 514, the spanning tree root bridge priority is updated to discourage the use of a port on the switch as the root bridge port. The spanning tree root bridge priority is updated to a higher value, such as 9999, to discourage the assignment of a port on the switch as the root bridge port. Further, verifying that the switch is not a root bridge for any virtual local area network (VLAN) is completed in Step 514. A VLAN represents a group of network devices (e.g. switches) that communicate despite the physical locality of each network device in the group. As mentioned above in FIG. 3, the root bridge port is the start of a route to route a packet to the packet's destination. Routing of packets is disrupted when the root bridge port is not active.

In Step 516, the switch leaves the MLAG domain if the switch is an MLAG peer. The switch leaves the MLAG domain by communicating to the MLAG peer that its MLAG peer state of the switch is inactive.

In Step 518, a log message is sent to the console of the management interface of the management port indicating that the switch is transitioning into maintenance mode.

In Step 520, shutdown of the ports on the switch, excluding the management port, is initiated. The management port remains active to perform software maintenance on the switch and configure the switch through the console of the management interface. The status of the ports, excluding the management port, are set to at least one of off or listen-only mode.

In Step 522, the ports that are not active (e.g., port in off or listen-only mode) are logged. In one embodiment of the invention, the ports that are not active may be logged to a user (e.g. network administrator) on a console on the management interface of the management port on the switch that remains active in maintenance mode.

FIG. 5A (or portions thereof) may be repeated for each switch requiring maintenance in the network and/or data center.

FIG. 5B shows a method for switch maintenance in accordance with one or more embodiments of the invention.

Turning to FIG. 5B, in Step 530, maintenance is performed on the switch. In one embodiment of the invention, the maintenance includes software and hardware maintenance. The software maintenance is performed by a user (e.g. network administrator) using the management port on the switch. The hardware maintenance is performed manually by a user (e.g. network administrator).

In Step 532, the switch is shut down to prepare for the boot-up of the switch (described below in FIG. 5C).

One skilled in the art will recognize that the switch may have iterations of maintenance including performing maintenance on the switch, shutting down the switch and booting up the switch into maintenance mode without departing from the invention.

FIG. 5B (or portions thereof) may be repeated for each switch requiring maintenance in the network and/or data center.

FIG. 5C shows a method for boot-up of a switch in accordance with one or more embodiments of the invention.

Turning to FIG. 5C, in Step 542, the switch is powered on. The switch is shutdown after maintenance is applied (described in FIG. 5B) and is powered on to perform the boot-up process of the switch.

In Step 544, the uplink ports on the switch are brought online. Bringing the uplink ports online refers to bringing the uplink ports to an active port status. In one embodiment of the invention, the uplink ports are indicated by the uplink ports in the state information of the production mode state snapshot.

In Step 546, a phase is identified in the boot-up process of the switch. In one embodiment of the invention, a phase is a network protocol that configures the switch in the network and/or data center. For example, the border gateway protocol (BGP) and interior gateway protocol (IGP) are phases in the boot-up process that exchange routes with routing peers to recover the routing tables. In the aforementioned phases the switch may determine routes of a received packet based on the recovered routing tables.

In Step 548, a phase exit condition for the phase identified in Step 546 is determined using the production mode state snapshot. The phase exit condition corresponds to the component of the state information in the production mode state snapshot representing the phase.

In Step 550, the phase identified in Step 546 is entered. In Step 552, a countdown timer is started when the phase is entered in Step 550. Each phase in the boot-up process has a countdown timer that is set to an estimated time to allow each phase to converge. A phase converges when the current state of the switch is the state of the switch before transitioning to maintenance mode. In one embodiment of the invention, the state of the switch before transitioning to maintenance mode is the phase exit condition for the phase in the production mode state snapshot of the switch.

In Step 554, a determination is made about whether the current state of the switch satisfies the phase exit condition. The current state of the switch satisfies the phase exit condition when the current state of the switch converges to the phase exit condition.

If a determination is made that the current state of the switch satisfies the phase exit condition, then the method may proceed to Step 556. In Step 556, a determination is made about whether there are any ports that need to be brought online. In one embodiment of the invention, ports of different types, including downlink ports and DVUPLINK ports, are brought online after a phase converges to the phase's phase exit condition. If a determination is made that there are ports to bring online, then the method may proceed to Step 558. In Step 558, the ports are brought online. Bringing the ports online refers to bringing the ports to an active port status.

In Step 560, a determination is made about whether there are remaining phases in the boot-up process of the switch. If a determination is made that there are no remaining phases in the boot-up process, the method may proceed to Step 562. In Step 562, the switch transitions to production mode. In Step 564, a post-maintenance mode snapshot is obtained once the switch is in production mode. The post-maintenance mode state snapshot may include the state information described in FIG. 3.

Returning to Step 560, if a determination is made that there are remaining phases in the boot-up process of the switch, then the method returns to Step 546.

Returning to Step 554, if the determination is made that the current state of the switch does not satisfy the phase exit condition, the method proceeds to Step 566. The current state of the switch does not satisfy the phase exit condition when the current state of the switch does not converge to the phase exit condition. In Step 566, a determination is made about whether the countdown timer of the phase started in Step 552 expires. The countdown timer expires when no time remains on the countdown timer. If a determination is made that the timer is not expired, the method may proceed to Step 568. The countdown timer is not expired when time remains on the countdown timer. In Step 568, the switch waits a period of time before returning to Step 554. The period of time corresponds to a time less than the time remaining on the countdown timer. The switch waits to converge to the phase exit condition.

Returning to Step 566, if a determination is made that the countdown timer expires, the method may proceed to Step 570. In Step 570, a determination is made about whether the boot-up process may proceed to the next phase. If a determination is made that the boot-up process may proceed to the next phase without convergence, the method proceeds to Step 556.

Returning to Step 570, if a determination is made that the boot-up process may not proceed to the next phase, then the method may proceed to Step 572. The boot-up process may not proceed when the current state of the switch may lead to the switch disrupting the network and/or data center in production mode. In Step 572, an intermediate snapshot of the current state of the switch is obtained. The intermediate snapshot may include the state information described in FIG. 3.

In Step 574, an alert is sent to the alert recipient. The alert includes the production mode snapshot and the intermediate snapshot. The state information in the intermediate snapshot may be compared to the state information in the intermediate snapshot to determine the reason for the abortion of the boot-up process. In one embodiment of the invention, the alert may be an email to the alert recipient. In another embodiment of the invention, the alert may be sent to the console of the management interface. The alert recipient includes a network administrator and IT operations of the network and/or data center.

In Step 576, in one embodiment of the invention, the boot-up process is aborted. The boot-up process does not continue when the boot-up process is aborted. The switch remains in maintenance mode.

FIG. 5C (or portions thereof) may be repeated for each switch requiring maintenance in the network and/or data center.

FIG. 5D shows a method for processing snapshots in accordance with one or more embodiments of the invention.

Turning to FIG. 5D, in Step 580, a determination is made about whether a production mode state snapshot matches a post-maintenance mode state snapshot in accordance with one or more embodiments of the invention.

If a determination is made that the production mode state snapshot does not match the post-maintenance mode state snapshot, then the method may proceed to Step 582. The production mode state snapshot does not match the post-maintenance mode state snapshot when at least one component in the state information (or phase exit condition) of both snapshots is not the equal. For example, the production mode state snapshot and the post-maintenance mode state snapshot do not match when the number of active ports goes from 4 in the production mode state snapshot to 3 in the post-maintenance mode state snapshot. In Step 582, the disparities between the production mode state snapshot and the post-maintenance mode state snapshot are logged. The disparities are the components in the state information of the production mode state snapshot and the post-maintenance mode snapshot that do not match. In one embodiment of the invention, the disparities may be logged in an email.

In Step 584, the logged disparities are sent to the alert recipient. In one embodiment of the invention, the logged disparities are sent by email to the alert recipient. In one embodiment of the invention, the alert recipient includes IT operations and a network administrator of the network and/or datacenter.

FIG. 5D (or portions thereof) may be repeated for each switch requiring maintenance in the network and/or data center.

Figure 6A:
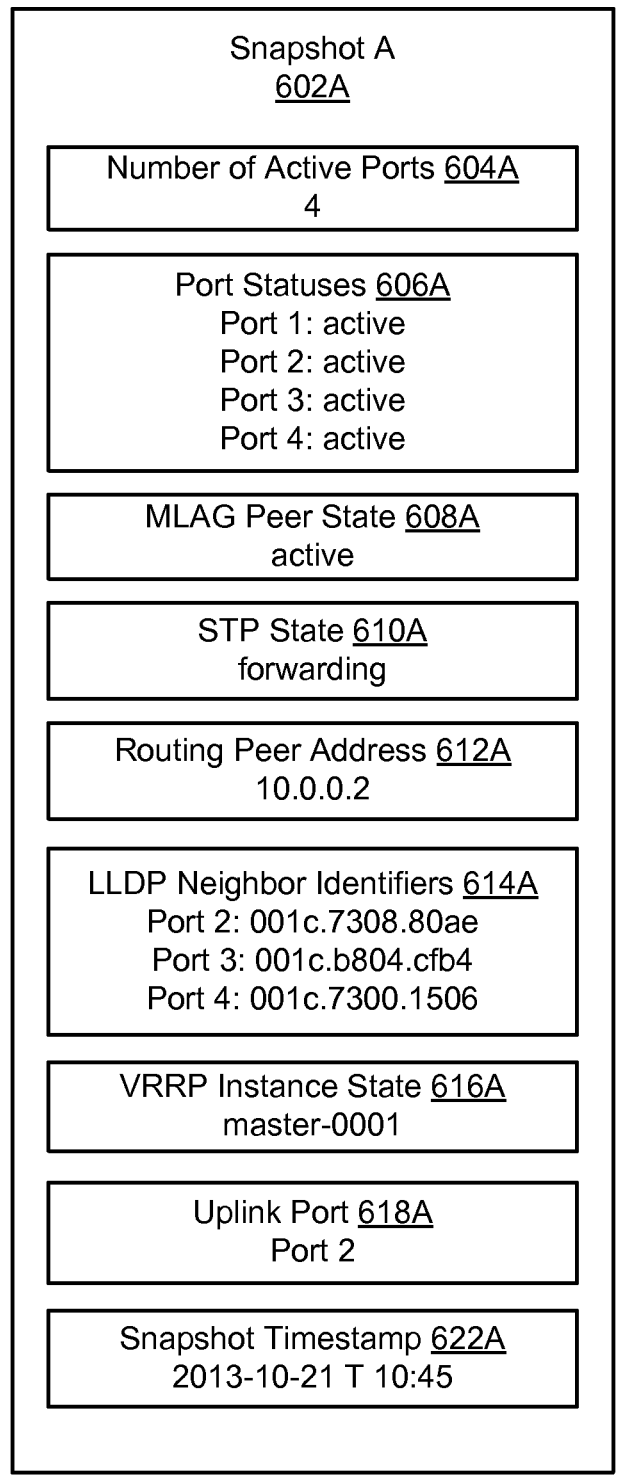
FIGS. 6A-6C show an example in accordance with one or more embodiments of the invention.
Figure 6B:
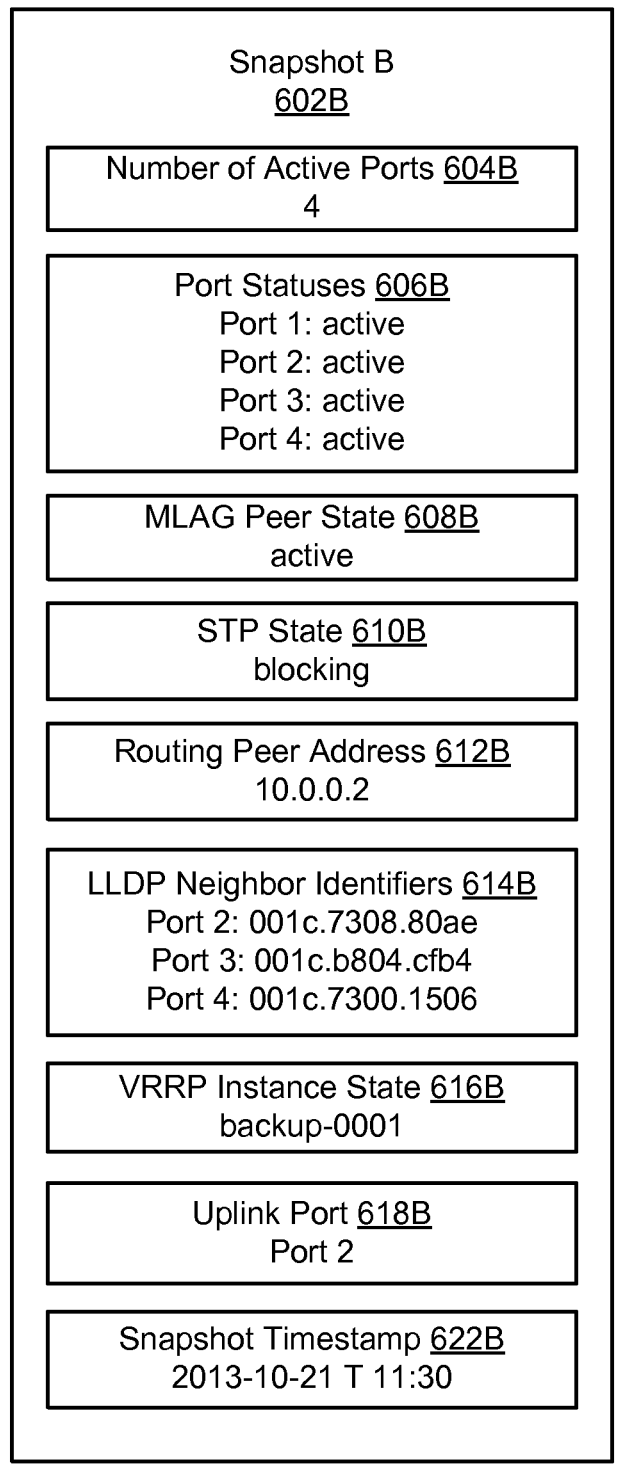
Figure 6C:
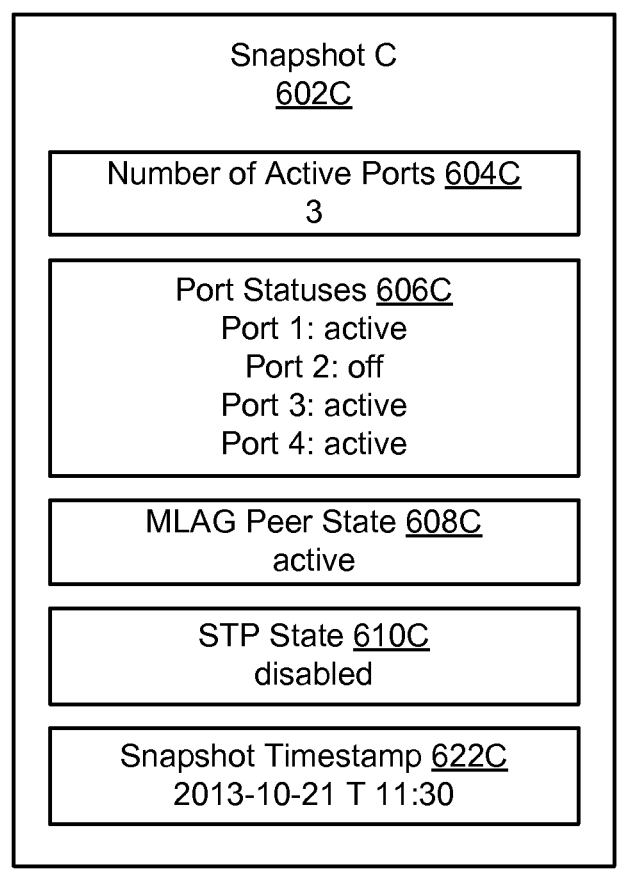

FIGS. 6A-6C show an example in accordance with one or more embodiments of the invention. The following example is for explanatory purposes only and not intended to limit the scope of the invention.

Turning to FIG. 6A, consider a scenario in which a multilayer leaf switch in production mode is identified as requiring maintenance by a user (e.g. network administrator). Snapshot A (602A) is obtained for the leaf switch while the leaf switch is in production mode and corresponds to a production mode state snapshot. Snapshot A includes the following state information to describe the operating state of the leaf switch: (i) number of active ports (604A), (ii) port statuses (606A), (iii) multichassis link aggregation protocol (MLAG) peer state (608), (iv) spanning tree protocol (STP) state (610A), (v) routing peer address (612A), (vi) link layer discovery protocol (LLDP) neighbor identifiers (614A), (vii) virtual router redundancy protocol (VRRP) instance state (616A), (viii) uplink port (618A), and (ix) snapshot timestamp (622A). Though not shown in FIG. 6A, there may be additional state information captured in snapshot A. Each component (i) to (ix) of the state information are the phase exit conditions for the boot-up of the leaf switch after performing maintenance.

Continuing with the example of FIG. 6A, consider a scenario in which snapshot A has 4 active ports. The active ports correspond to a management port (port 1), an uplink port to a spine switch in the network and/or data center (port 2), a downlink port to a server in the network and/or data center (port 3), and a MLAG port to link to a MLAG peer (port 4). The port statuses of port 1 to port 4 on the leaf switch are active. The MLAG peer state connected via port 4 on the leaf switch is active. The STP state of port 2 on the leaf switch is in the forwarding state. The leaf switch has a routing peer whose IP address may correspond to 10.0.0.2. The leaf switch has three LLDP neighbors whose LLDP neighbor identifiers may be the following MAC addresses 001c.7308.80ae corresponding to the spine switch connected via port 2, 001c.b804.cfb4 corresponding to the server connected via port 3, and 001c.7300.1506 corresponding to the MLAG peer connected via port 4. The VRRP instance state is master-0001 representing that the leaf switch is the master of a virtual router with a virtual router identifier (VRID) of 0001. The uplink port is port 2 corresponding to the connection between the leaf switch and a spine switch. Finally, the snapshot timestamp is 2013-10-21 T 10:45. The snapshot timestamp indicates that snapshot A was obtained at 10:45 am on Oct. 21, 2013.

Continuing with the example of FIG. 6A, once snapshot A is obtained, the server connected to port 3 on the leaf switch is placed into maintenance mode. There are two virtual machines on the server. The two virtual machines on the server are moved to another server in the network and/or data center that is not in maintenance mode. The VRRP peers of the virtual router with VRID of 0001 are notified that the leaf switch is inactive. Because the leaf switch is the master of the virtual router with VRID 0001, the VRRP peer with the highest priority ranking assumes the master role. The routing metrics are increased to a very large number to discourage the use of the leaf switch in routing of a packet. The leaf switch's STP priority is set to 9999 to discourage the use of the switch as a root bridge. The leaf switch leaves the MLAG domain. Ports 2 to 4 are shut down, leaving port 1 (management port) active. Ports 2 to 4 are logged as not active in the console on the management interface on the management port. The leaf switch is now in maintenance mode and ready for a user (e.g. network administrator) to update the operating system (OS) of the leaf switch and shuts the leaf switch down.

Referring to FIG. 6B, FIG. 6B is a continuation of FIG. 6A. Consider a scenario in which the leaf switch from FIG. 6A undergoes a boot-up process after shutting down to apply the software maintenance. Once the leaf switch is powered on, the uplink port is brought online. The uplink port is known from the uplink port A (618A) in snapshot A (602A). The leaf switch enters a MLAG phase to allow the MLAG domain to form and triggers the start of the countdown timer for the MLAG phase. The MLAG phase exit condition corresponds to the MLAG peer state A (608A) in snapshot A (602A). The MLAG peer state B (608B) is active and converges to the MLAG peer state A (608A). As a result, the current state of the leaf switch satisfies the MLAG phase exit condition before the countdown expires. The boot-up process may then continue without waiting for the countdown timer to expire. Before exiting the phase, port 3 and port 4 are brought online. The leaf switch then enters the STP phase in the boot-up process and triggers the countdown timer for the STP phase. The current state of the leaf switch does not converge to the STP phase exit condition in the STP state A (610A) when the countdown timer expires. The current state of the leaf switch is an STP state of blocking. The boot-up process can continue given the current STP state of the leaf switch. The leaf switch enters a routing phase to allow the routing peer to connect and triggers the start of the countdown timer for the routing phase. The routing phase exit condition corresponds to the routing peer address A (612A) in snapshot A (602A). The routing peer address B (612B) is 10.0.0.2 and converges to the routing peer address A (612A). As a result, the current state of the leaf switch satisfies the routing phase exit condition before the countdown expires. The boot-up process may then continue without waiting for the countdown timer to expire. The leaf switch enters a LLDP phase to allow the verify the MAC addresses of the LLDP neighbors and triggers the start of the countdown timer for the LLDP phase. The LLDP phase exit condition corresponds to the LLDP neighbor identifiers A (614A) in snapshot A (602A). The LLDP neighbor identifiers B (614B) are 001c.7308.80ae corresponding to port 2, 001c.b804.cfb4 corresponding to port 3, and 001c.7300.1506 corresponding to port 4 and converges to the LLDP neighbor identifiers A (614A). As a result, the current state of the leaf switch satisfies the LLDP phase exit condition before the countdown expires. The boot-up process may then continue without waiting for the countdown timer to expire. The final phase the leaf switch enters is the VRRP phase and triggers the start of the countdown timer for the VRRP phase. The current state of the leaf switch does not converge to the VRRP phase exit condition in the VRRP instance state A (616A) when the countdown timer expires. The current state of the leaf switch is a VRRP instance state of backup-0001. The boot-up process can continue given the current VRRP state of the leaf switch. No remaining phases in the boot-up process exist. The leaf switch transitions from maintenance mode to production mode. Snapshot B is then obtained once the leaf switch is in production mode and corresponds to the post-maintenance mode state snapshot. Snapshot B does not match snapshot A due to the following disparities: (1) the STP state B (610B) is in a blocking state rather than a forwarding state in STP state A (610A); and (2) the VRRP instance state B (616B) is backup-0001 rather than master-0001 in VRRP instance state A (616A). The disparities are logged in an email that includes snapshot A and snapshot B. The email is sent to IT Operations of the network.

Referring to FIG. 6B, in another embodiment of the invention, when the current state of the leaf switch does not converge to the VRRP phase exit condition in the VRRP instance state A (616A) when the countdown timer expires, a second determination made be made with respect to whether the priority of the leaf switch is higher than another switch that is currently the VRRP master. In scenarios in which the priority of the leaf switch is higher than the other switch that is the current VRRP master, the leaf switch may transition to become the VRRP master. Alternatively, or additionally, the above determination may be made based on whether a preempt flag is set for the leaf switch. In cases where the preempt flag is set for the leaf switch, the leaf switch may transition to become the VRRP master. In both of the above embodiments, an email (or other notification) may be sent to IT Operations of the network where the email indicates that the leaf switch has transitioned to the master VRRP.

Referring to FIG. 6C, FIG. 6C is a continuation of FIG. 6A and has no relation to FIG. 6B. Consider a scenario in which the leaf switch from FIG. 6A undergoes a boot-up process after shutting down to apply the software maintenance. Once the leaf switch is powered on, the uplink port is brought online. The uplink port is known from the uplink port A (618A) in snapshot A (602A). The leaf switch enters a MLAG phase to allow the MLAG domain to form and triggers the start of the countdown timer for the MLAG phase. The MLAG phase exit condition corresponds to the MLAG peer state A (608A) in snapshot A (602A). The MLAG peer state C (608C) is active and converges to the MLAG peer state A (608A). As a result, the current state of the leaf switch satisfies the MLAG phase exit condition before the MLAG countdown expires. The boot-up process may then continue without waiting for the MLAG countdown timer to expire. Before exiting the phase, port 3 and port 4 are brought online. The leaf switch then enters the STP phase in the boot-up process and triggers the countdown timer for the STP phase. The current state of the leaf switch does not converge to the STP phase exit condition in the STP state A (610A) when the countdown timer expires. The current state of the leaf switch is an STP state of disabled. The boot-up process cannot continue given the current STP state of the leaf switch. The boot-up process is aborted. Before aborting the boot-up process, snapshot C is obtained and corresponds to the current state of the leaf switch in the boot-up process.

Continuing with the example in FIG. 6C, the number of active ports C (604C) is 3 in snapshot C (602C) and is one less than the number of active ports A (604A). The port statuses C (606C) match the port statuses A (606A) except port 2 has a status of off. The MLAG peer state C (608C) is active and matches the MLAG peer state A (608A). The STP state C (610C) of port 2 is disabled and does not match the STP state A (610A) of port 2. An email alert is sent to a network administrator. The alert includes snapshot A, snapshot C and the messages logged to the console of the management interface of the management port. From snapshot C, the network administrator determines that the STP state of port 2 is disabled as port 2 is off. The network administrator verifies that the STP state A of port 2 in snapshot A is forwarding and determines that Port 2 is disconnected from the hardware maintenance performed in maintenance mode.

Embodiments of the invention enable a user (e.g. a network administrator) to automate (or substantially automate) the boot-up process of a switch in maintenance mode determined by snapshots describing the operating state of a switch. Additionally, performing maintenance on the switch typically requires that the switch be taken offline and then restarted with the maintenance applied. The operating state of the switch is prone to errors once the switch resumes operation in production mode. Obtaining the snapshots of a switch may identify errors in the operating state of the switch during or after the boot-up process. The production mode snapshot may additionally accelerate the boot-up process of the switch by exiting phases using the state information in the snapshot rather than the expiry of the countdown timer.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable medium comprising instructions, which when executed by at least one processor perform a method, the method comprising:
    identifying a first phase to enter in a boot-up process for a switch, wherein the boot-up process comprises a plurality of phases and the first phase is one of the plurality of phases;
    determining a phase exit condition from a first snapshot of the switch, wherein the first snapshot comprises state information for each of the plurality of phases;
    transitioning to the first phase;
    after transitioning to the first phase:
        starting a first countdown timer for the first phase;
        executing, on the switch, a first networking protocol for the first phase;
        determining, in response to the executing, that a first current state of the switch satisfies the phase exit condition; and
        exiting the first phase, wherein the first countdown timer is not expired when exiting the first phase.

2. The non-transitory computer readable medium of claim 1, further comprising:
    identifying, after exiting the first phase, a second phase to enter in the boot-up process for the switch;
    determining a second phase exit condition from the first snapshot of the switch;
    transitioning to the second phase;
    after transitioning to the second phase:
        starting a second countdown timer for the second phase;
        executing, on the switch, a second networking protocol for the second phase;
        determining, in response to the executing of the second networking protocol, that a second current state of the switch does not satisfy the second phase exit condition;
        exiting the second phase after the second countdown timer expires;
        making a determination that the second current state of the switch is sufficient to allow the boot-up process to continue; and
        in response to the determination, continuing the boot-up process on the switch.

3. The non-transitory computer readable medium of claim 1, further comprising:
    identifying, after exiting the first phase, a second phase to enter in the boot-up process for the switch;
    determining a second phase exit condition from the first snapshot of the switch;
    transitioning to the second phase;
    after transitioning to the second phase:
        starting a second countdown timer for the second phase;
        executing, on the switch, a second networking protocol for the second phase;
        determining, in response to the executing of the second networking protocol, that a second current state of the switch does not satisfy the second phase exit condition;
        exiting the second phase after the second countdown timer expires;
        making a determination that the second current state of the switch is not sufficient to allow the boot-up process to continue;
        in response to the determination, obtaining an intermediate snapshot of the switch;
        sending an alert to the alert recipient, wherein the alert comprises information from the intermediate snapshot; and
        aborting the boot-up process on the switch.

4. The non-transitory computer readable medium of claim 1, further comprising:
    determining that the first phase is a last phase in the boot-up process on the switch;
    transitioning to production mode;
    obtaining a second snapshot of the switch;
    making a second determination that the first snapshot does not match the second snapshot;
    in response to the second determination, log disparities between the first snapshot and the second snapshot; and
    sending an alert to the alert recipient, wherein the alert comprises the disparities between the first snapshot and the second snapshot.

5. The non-transitory computer readable medium of claim 1, further comprising:
    prior to identifying the first phase to enter in the boot-up process for the switch:
        determining that the switch requires maintenance;
        obtaining the first snapshot of the switch; and
        transitioning to maintenance mode after obtaining the first snapshot.

6. The non-transitory computer readable medium of claim 1, wherein the first networking protocol comprises one selected from a group consisting of address resolution protocol, interior gateway protocol, border gateway protocol, link layer discovery protocol, multi-chassis link aggregation protocol, protocol independent multicast, internet group management protocol, and virtual router redundancy protocol.

7. A method for maintaining a switch, comprising:
    identifying a first phase to enter in a boot-up process for the switch, wherein the boot-up process comprises a plurality of phases and the first phase is one of the plurality of phases;
    determining a phase exit condition from a first snapshot of the switch, wherein the first snapshot comprises state information for each of the plurality of phases;
    transitioning to the first phase;
    after transitioning to the first phase:
        starting a first countdown timer for the first phase;
        executing, on the switch, a first networking protocol for the first phase;
        determining, in response to the executing, that a first current state of the switch satisfies the phase exit condition; and
        exiting the first phase, wherein the first countdown timer is not expired when exiting the first phase.

8. The method of claim 7, further comprising:
identifying, after exiting the first phase, a second phase to enter in the boot-up process for the switch;
determining a second phase exit condition from the first snapshot of the switch;
transitioning to the second phase;
after transitioning to the second phase:
starting a second countdown timer for the second phase;
executing, on the switch, a second networking protocol for the second phase;
determining, in response to the executing of the second networking protocol, that a second current state of the switch does not satisfy the second phase exit condition;
exiting the second phase after the second countdown timer expires;
making a determination that the second current state of the switch is sufficient to allow the boot-up process to continue; and
in response to the determination, continuing the boot-up process on the switch.

9. The method of claim 7, further comprising:
identifying, after exiting the first phase, a second phase to enter in the boot-up process for the switch;
determining a second phase exit condition from the first snapshot of the switch;
transitioning to the second phase;
after transitioning to the second phase:
starting a second countdown timer for the second phase;
executing, on the switch, a second networking protocol for the second phase;
determining, in response to the executing of the second networking protocol, that a second current state of the switch does not satisfy the second phase exit condition;
exiting the second phase after the second countdown timer expires;
making a determination that the second current state of the switch is not sufficient to allow the boot-up process to continue;
in response to the determination, obtaining an intermediate snapshot of the switch;
sending an alert to the alert recipient, wherein the alert comprises information from the intermediate snapshot; and
aborting the boot-up process on the switch.

10. The method of claim 7, further comprising:
determining that the first phase is a last phase in the boot-up process on the switch;
transitioning to production mode;
obtaining a second snapshot of the switch;
making a second determination that the first snapshot does not match the second snapshot;
in response to the second determination, log disparities between the first snapshot and the second snapshot; and
sending an alert to the alert recipient, wherein the alert comprises the disparities between the first snapshot and the second snapshot.

11. The method of claim 7, further comprising:
prior to identifying the first phase to enter in the boot-up process for the switch:
determining that the switch requires maintenance;
obtaining the first snapshot of the switch; and
transitioning to maintenance mode after obtaining the first snapshot.

12. The method of claim 7, wherein the first networking protocol comprises one selected from a group consisting of address resolution protocol, interior gateway protocol, border gateway protocol, link layer discovery protocol, multi-chassis link aggregation protocol, protocol independent multicast, internet group management protocol, and virtual router redundancy protocol.

13. A switch, comprising:
a management port,
a plurality of ports,
a processor;
memory comprising instructions, which when executed by the processor, enable the switch to perform a method, the method comprising:
identifying a first phase to enter in a boot-up process for the switch, wherein the boot-up process comprises a plurality of phases and the first phase is one of the plurality of phases;
determining a phase exit condition from a first snapshot of the switch, wherein the first snapshot comprises state information for each of the plurality of phases;
transitioning to the first phase;
after transitioning to the first phase:
starting a first countdown timer for the first phase;
executing, on the switch, a first networking protocol for the first phase;
determining, in response to the executing, that a first current state of the switch satisfies the phase exit condition; and
exiting the first phase, wherein the first countdown timer is not expired when exiting the first phase.

14. The switch of claim 13, further comprising:
prior to identifying the first phase to enter in the boot-up process for the switch:
disabling the plurality of ports on the switch.

15. The switch of claim 14, further comprising:
transitioning to maintenance mode after disabling the plurality of ports on the switch.

16. The switch of claim 13, further comprising:
prior to exiting the first phase:
enabling a subset of the plurality of ports on the switch.

17. The switch of claim 13, further comprising:
determining that the first phase is a last phase in the boot-up process on the switch;
transitioning to production mode;
obtaining the second snapshot of the switch;
making a determination that the first snapshot does not match the second snapshot;
in response to the determination, logging disparities between the first snapshot and the second snapshot; and
sending an alert to the alert recipient, wherein the alert comprises the disparities between the first snapshot and the second snapshot.

18. The switch of claim 13, wherein the management port remains active, while the switch is in maintenance mode.

19. The switch of claim 13, wherein the switch is a multi-layer switch.

* * * * *